July 31, 1956
N. T. SAWDEY
2,756,490
APPARATUS FOR APPLYING COUPLINGS TO
THE THREADED ENDS OF PIPES
Filed March 22, 1950
7 Sheets-Sheet 1
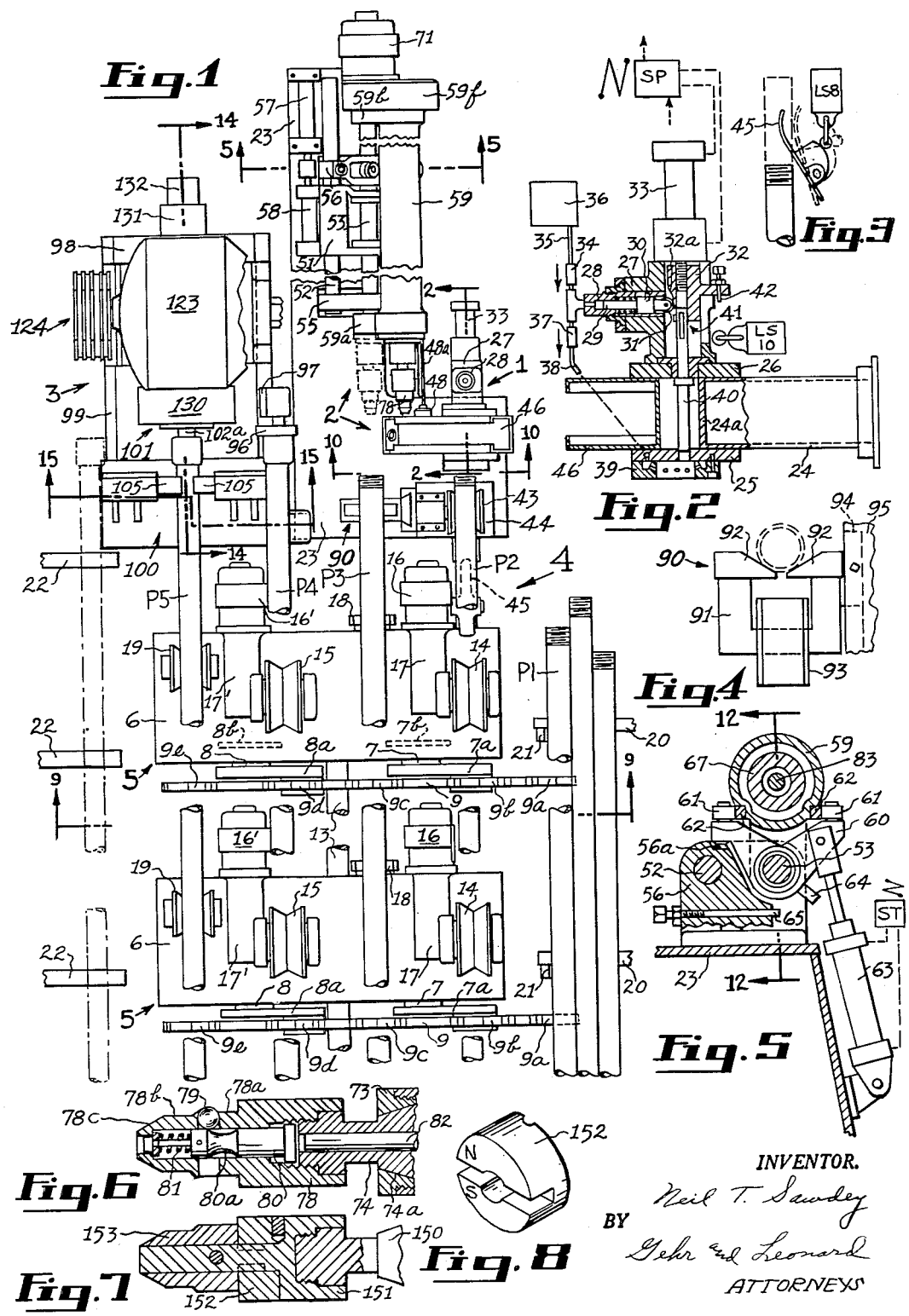
INVENTOR.
Neil T. Sawdey
BY
Gehr and Leonard
ATTORNEYS July 31, 1956 N. T. SAWDEY 2,756,490
APPARATUS FOR APPLYING COUPLINGS TO
THE THREADED ENDS OF PIPES
Filed March 22, 1950 7 Sheets-Sheet 2
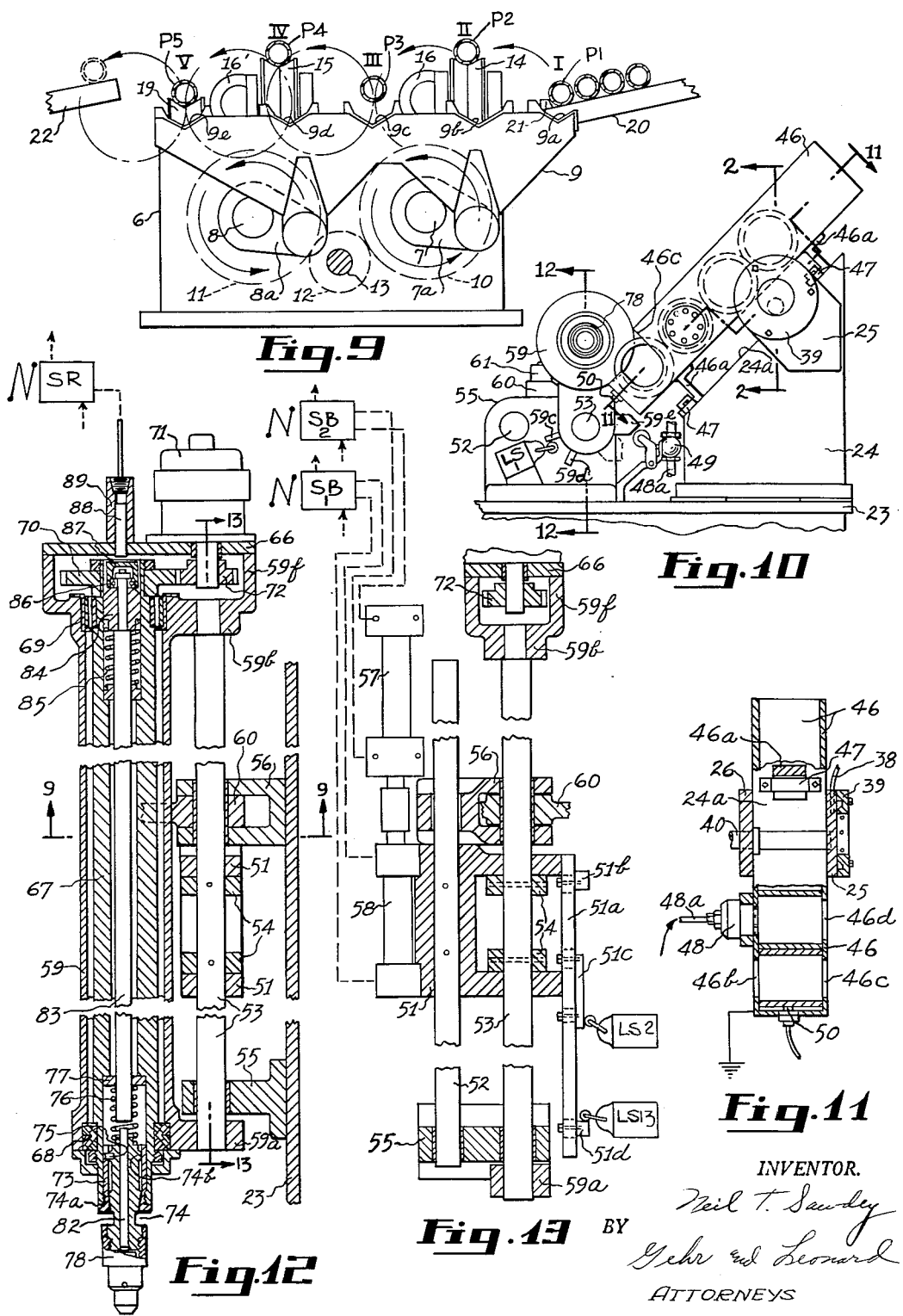
INVENTOR.
Neil T. Sawdey
BY
Gehr and Leonard
ATTORNEYS

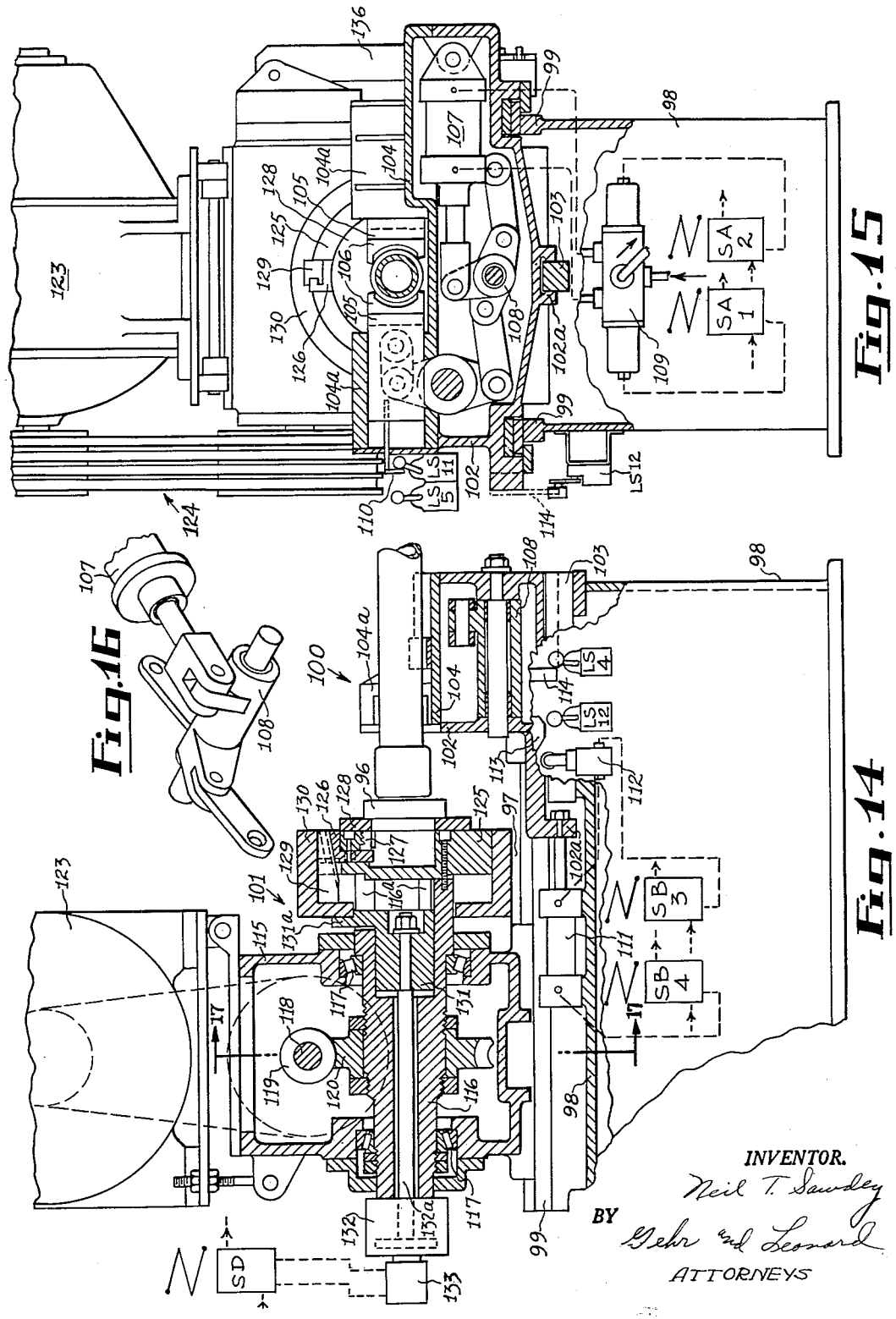

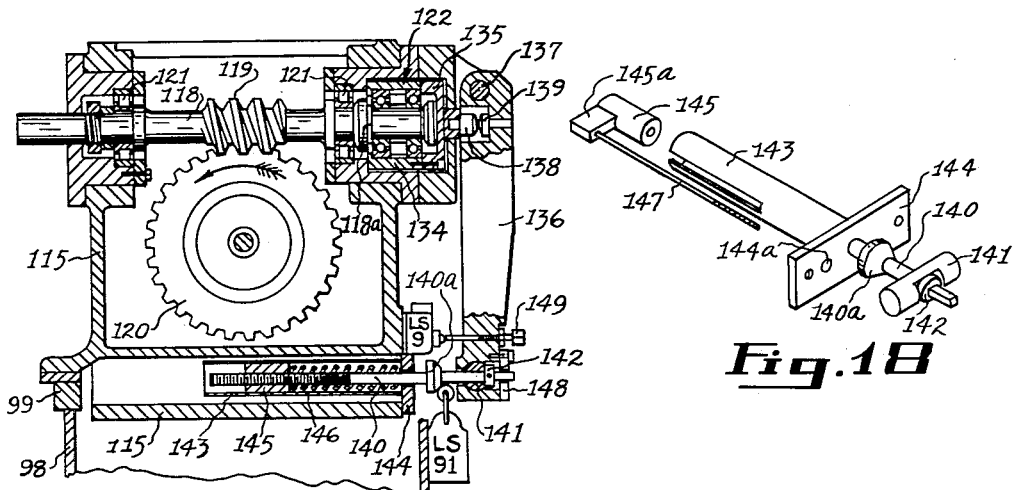

INVENTOR.
Neil T. Sawdey
BY
Gehr and Leonard
ATTORNEYS

July 31, 1956 N. T. SAWDEY 2,756,490
APPARATUS FOR APPLYING COUPLINGS TO
THE THREADED ENDS OF PIPES
Filed March 22, 1950 7 Sheets-Sheet 7

Inventor
Neil T. Sawdey
By
Gehr and Leonard
Attorneys

United States Patent Office 2,756,490
Patented July 31, 1956

2,756,490

APPARATUS FOR APPLYING COUPLINGS TO THE THREADED ENDS OF PIPES

Neil T. Sawdey, Shaker Heights, Ohio, assignor to The Pipe Machinery Company, Cleveland, Ohio, a corporation of Ohio Application March 22, 1950, Serial No. 151,121

18 Claims. (Cl. 29—240)

The invention relates to apparatus for assembling internally threaded couplings on the ends of pipe sections.

In the commercial production and marketing of threaded pipe sections it is customary to ship the pipe sections with a coupling screwed home on one end of each section, such practice serving to reduce the amount of hand labor required in the field for connecting up the sections, with the added advantage that the assembled coupling serves as a protector for one of the pipe threads during transportation and handling. In large scale pipe manufacture the volume of pipe sections to be coupled has in prior practice required a relatively large amount of manual labor in the manufacturing plant and has constituted a substantial part of the overall cost of production.

It is an object of the present invention to provide automatic apparatus for assembling threaded pipe sections and couplings.

A further object of the invention is to provide such apparatus that is capable of high speed operation and of turning out a relatively large volume of work.

Another object of the invention, more or less ancillary or incidental to the realization of the objects already noted, is to provide apparatus designed to perform the necessary work in a series of steps which can be carried out successively on each pipe and coupling assembly but with different steps carried out simultaneously on a plurality of assemblies, so that there is a minimum of time lost in the operation of the apparatus.

With the various objects of the invention in view it consists, in preferred form, of apparatus combining cooperative means for performing the required work in three stages, namely, means for applying thread lubricant to one or the other of the pipe and coupling elements to be joined together, means for starting a coupling on a pipe end by applying the coupling thereto and screwing it on to a state of tightness such that it will not loosen in the further treatment by the apparatus, means for fully tightening the coupling to any predetermined degree and, finally, means for simultaneously transferring a plurality of pipe sections from station to station (that is from one means to another) of the apparatus and finally to a point of discharge—all under coordinated automatic control means which cause the entire apparatus to function as a unit.

For the purpose of further description and explanation of the invention reference is made to the accompanying drawings showing specific embodiments of the invention which have been found satisfactory.

In the drawings,

Fig. 1 is a plan view of a combined apparatus embodying the invention, some parts of the apparatus being broken away to permit illustration on an adequate scale.

Fig. 2 is an enlarged view showing the lubricating mechanism partly in side elevation and partly in vertical section taken on the line 2—2 of Figs. 1 and 10.

Fig. 3 is an enlarged fragmentary side elevation of a control device.

Fig. 4 is an enlarged front elevation of the magnetic pipe-holding device.

Fig. 5 is an enlarged vertical section on the line 5—5 of Fig. 1 with the angularly movable parts of the mechanism shown in their upright positions illustrated in Figs. 10 and 12.

Fig. 6 is an enlarged axial section of a coupling chuck or gripper and cooperating spindle parts.

Fig. 7 is a similar view of an alternative magnetic type of coupling chuck.

Fig. 8 is a perspective view of the permanent magnet element of the chuck shown in Fig. 7.

Fig. 9 is a vertical transverse section through the pipe transfer means taken on the line 9—9 of Fig. 1, with the majority of the parts appearing in elevation.

Fig. 10 is an enlarged front elevation of the means for applying thread lubricant and starting the application of a coupling to a pipe section, the said means being viewed from the plane represented by the line 10—10 in Fig. 1, but with the angularly movable ram in a vertical position instead of the inclined position shown in Fig. 1.

Fig. 11 is a section on the broken line 11—11 in Fig. 10.

Fig. 12 is a vertical section taken on the line 12—12 in Fig. 10.

Fig. 13 is a horizontal section taken on the line 13—13 of Fig. 12.

Fig. 14 is an enlarged vertical sectional view of the coupling tightening means of the apparatus the section being taken on the line 14—14 in Fig. 1 with some parts of the apparatus shown in elevation and some parts broken away to permit illustration on the larger scale.

Fig. 15 is a front elevation of the apparatus shown in Fig. 14 with the pipe chuck mechanism shown in vertical section on the broken line 15—15 of Fig. 1.

Fig. 16 is a fragmentary perspective view of the power-actuating means for the sliding pipe chuck shown in Figs. 14 and 15.

Fig. 17 is an enlarged fragmentary vertical section taken on the line 17—17 of Fig. 14.

Fig. 18 is a detached perspective view of parts of the mechanism shown in Fig. 17.

Fig. 19 is a front elevation of the rotary coupling chuck mechanism shown in Fig. 14, with one of the parts partially broken away to more fully show details of construction.

Figs. 20 and 21 are enlarged perspective views of parts of the chuck mechanism shown in Fig. 19.

Fig. 22 is a front elevation of alternative pipe-holding or gripping means that may be used with the coupling starter mechanism in lieu of the magnetic form of holder shown in Figs. 1 and 4.

Fig. 23 is a transverse vertical section of the alternative pipe holder, the section being taken on the line 23—23 of Fig. 24.

Fig. 24 is a view of the alternative holder partly in end elevation and partly in section on the line 24—24 of Fig. 23.

Figure 25:
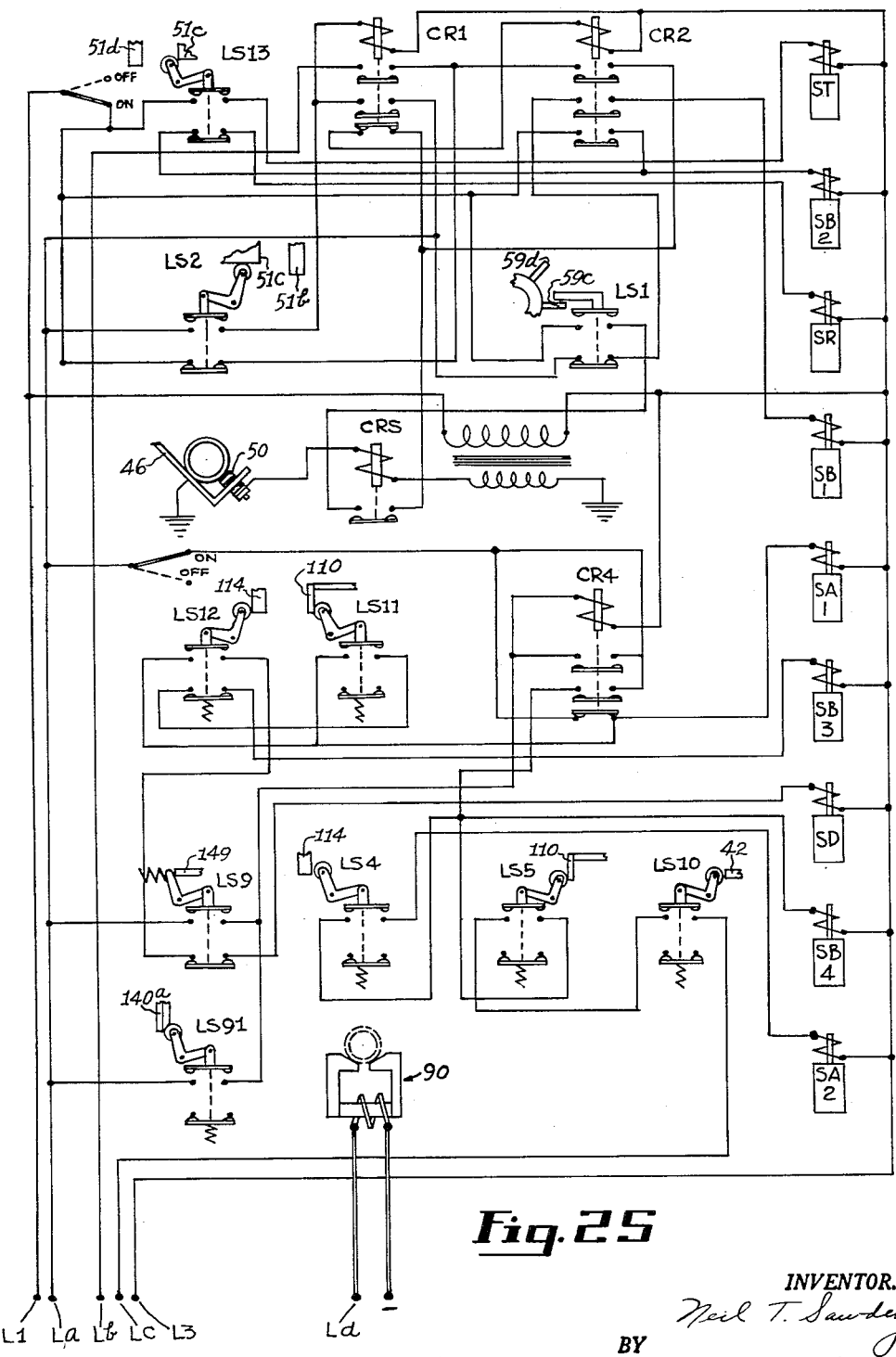
Fig. 25 is an electrical diagram illustrating a suitable control system for the lubricating mechanism and coupling starting and tightening mechanisms.
Figure 26:
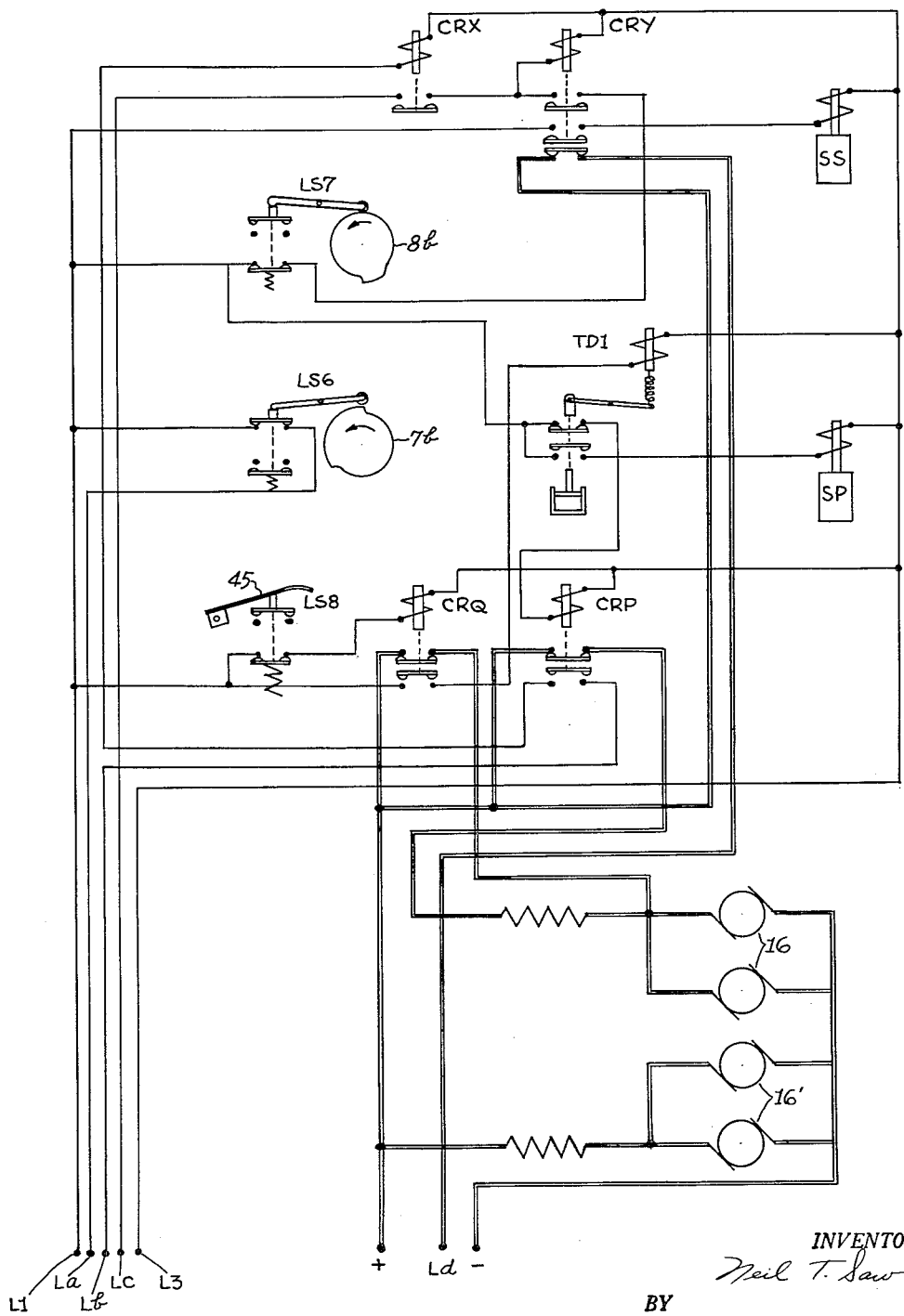
Fig. 26 is a supplementary diagram showing more particularly parts of the electrical system which controls the pipe transfer mechanism.
Figure 27:
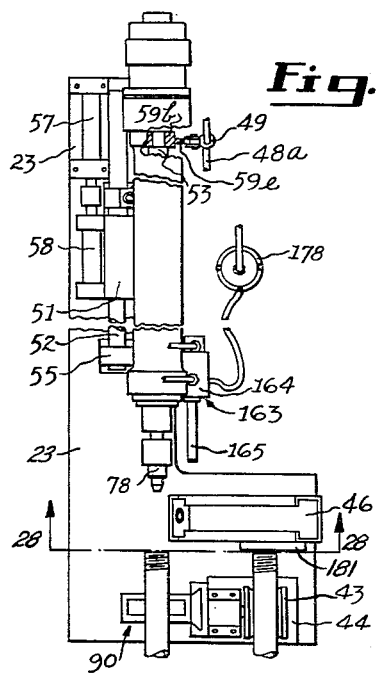
Fig. 27 is a plan view showing modified lubricating and starting mechanisms.
Figure 28:
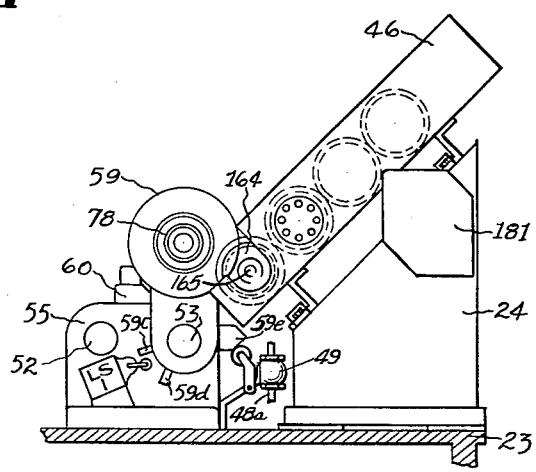
Fig. 28 is an enlarged front elevation of the lubricating and starting mechanisms, the same being viewed from the plane represented by the line 28—28 in Fig. 27.
Figure 29:
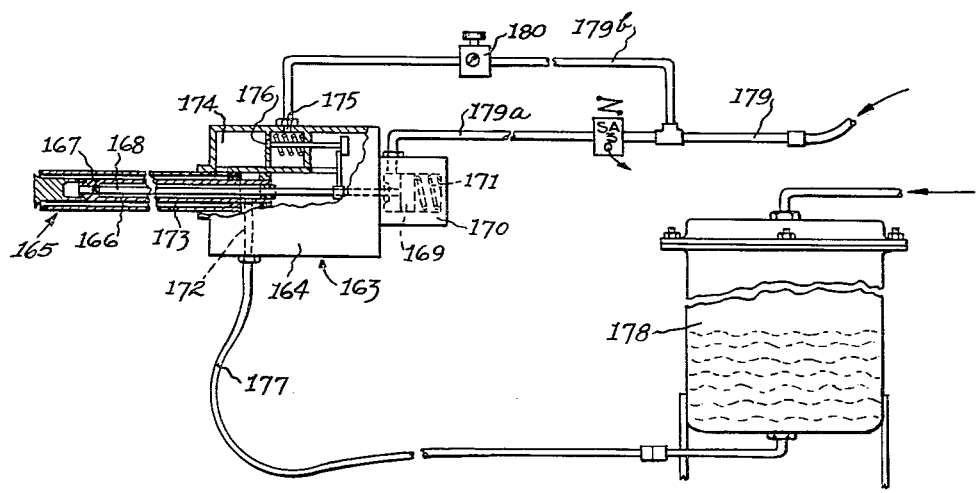
Fig. 29 is a diagrammatic view of the lubricant spray gun and appurtenant devices of the modified lubricating mechanism.

In Figures 1 to 17 of the drawings certain control devices, such as limit switches and solenoid valves, are shown more or less diagrammatically to facilitate understanding of the electrical system diagrams constituting Figures 25 and 26.

Considering in detail the apparatus illustrated in the drawings, and with reference, at the outset, especially to Figs. 1 and 9, the apparatus comprises a pipe thread lubricating mechanism generally designated by numeral 1, a mechanism, generally designated 2, for starting the application of a coupling to the threaded end of a pipe, mechanism generally designated 3 for tightening the coupling on the pipe and pipe transfer mechanism, generally designated 4, for presenting pipe sections to the mechanisms 1, 2 and 3 in turn, the operations of the parts of the entire apparatus being carried out interdependently and in definite timed relation to each other.

*Pipe transfer mechanism*

In so far as the present invention is concerned, various forms of pipe transfer means can be employed. The form herein shown is manufactured by The Pipe Machinery Company of Cleveland, Ohio. It is well known to the trade and is disclosed in detail in the pending application of Benninghoff and Thompson, Serial No. 737,500, filed March 27, 1947 (now Patent No. 2,690,572). For the purposes of the present application it has been deemed sufficient to show in the drawings those parts of the mechanism which directly cooperate with mechanisms 1, 2 and 3.

The transfer mechanism comprises two or more "stands" 5, 5 disposed in mutual alignment and each comprising a frame and housing structure 6 that supports a pair of parallel shafts 7, 8, on which are mounted cranks 7a and 8a. The wrist pins of said cranks carry a vertically disposed, plate-like pipe shifter 9 having at its top notches 9a, 9b, 9c, 9d and 9e to receive a plurality of pipe sections. Fast on shafts 7 and 8 are gears 10 and 11, respectively, and these gears mesh with a pinion 12 mounted on a shaft 13 common to the several stands so that the crank shafts of all the stands are caused to turn in unison. Power means (not shown herein) are provided to drive the crank shafts in a manner to effect a succession of single-rotation movements thereof from the starting point shown in Fig. 9. Such power means may take the form of a hydraulic drive such as is shown in the application Serial No. 737,500, identified above, or of power means including a clutch of known single-rotation type, or of other known single-rotation mechanism. In the preferred form of transfer mechanism using the hydraulic drive automatic control means are provided comprising rotary drive cams 7b and 8b which actuate limit switches LS6 and LS7 respectively, the cams being mounted on suitable rotary parts of the stands 5, such as one of the shafts 7 and one of the shafts 8 (Figs. 1 and 26).

On each of the stands 5 is mounted a live roll 14, driven by an electric motor 16 through worm gearing 17. Adjacent the motor 16 of each stand is arranged a fixed but vertically adjustable pipe support 18. Each stand is also equipped with a live roll 15 driven by a motor 16' and worm gear 17'. Finally each stand has an idle roller 19. The rolls 14, 15 and 19 and the fixed supports 18 of the several stands are respectively aligned as shown in Fig. 1.

An one side of the stands 5 are arranged inclined skid rails 20 positioned to feed pipes to the shifters 9, the rails 20 being fitted with adjustable stops 21 to locate the advance pipe in position to be engaged by the notchs 9a of the shifters (Fig. 9), adjustment of the stops adapting them for work on pipes of different diameters. At the other side of the stands 5 are arranged inclined discharge rails 22 positioned to receive pipes discharged from the machine.

As will be apparent from Fig. 9, on each actuation of the transfer mechanism the pipe shifters 9 are moved in parallelism by the two cranks 7a, 8a so that each of the five pipe-receiving notches 9a—9e traces a circular orbit as indicated by the curved arrows. The shifters 9 are thus adapted to handle five pipes simultaneously on each actuation. In Fig. 9 such pipes are designated P1, P2, P3, P4, P5, and respectively occupy five distinct stations designated I, II, III, IV and V, the skid stops 21 being at station I, live rolls 14 at station II, fixed supports 18 at station III, live rolls 15 at station IV and idle rolls 19 at station V. It is apparent that each actuation of the transfer shifters 9 will advance each pipe from the station occupied by it to the next station in advance, the pipe P5 in the last station, however, being discharged from the machine.

*Lubricating mechanism*

The purpose of this mechanism is to apply to the threads of the pipe and coupling elements suitable heavy lubricant such as is commonly used for the purpose. This is preferably accomplished by spraying the lubricant upon the threads of either the pipe or the coupling elements. In the apparatus shown in Figs. 1 and 2 the lubricating mechanism is designed to apply the lubricant to the pipe thread.

Adjacent stations II and III of the transfer mechanism is arranged a relatively large L-shaped base frame 23 to support the lubricating mechanism 1 and the coupling starting mechanism 2. The lubricating mechanism (Figs. 1, 2 and 10) comprises a frame 24 mounted on frame 23 and having a top wall 24a which is sharply inclined, for a purpose which will presently appear. Bracket plates 25 and 26 are welded to the front and rear walls respectively of frame 24 and bracket 26 carries a lubricant pump frame 27 (Fig. 2) which carries a vertically adjustable pump cylinder 28 fitted with a spring-biased plunger 29. The plunger carries a pin 30 which engages a slot in cylinder 28 to prevent rotation of the plunger and limit its downward movement. This latter construction maintains anti-friction roller 31 on the lower end of plunger 29 in proper working relation to cam slide 32 which is mounted in frame 27. Slide 32 is operatively connected to the piston of a hydraulic motor 33 which operates under control of solenoid valve SP to reciprocate the slide. Forward movement of slide 32 causes its cam surface 32a to lift the plunger against the tension of its spring while the retraction of the slide 32 permits the spring to lower the plunger. On its downward movement the plunger draws lubricant through check valve 34 and conduit 35 from supply reservoir 36 while on its upward movement the plunger forces lubricant through a check valve 37 and conduit 38. By vertical adjustment of cylinder 28 the bottom position of the plunger can be varied in relation to the cam 32a to vary the length of the plunger stroke and the amount of lubricant discharged from the cylinder.

An annular lubricant nozzle 39 is mounted on the front bracket 25 of the lubricating mechanism to form a socket in position to receive the end of a pipe section in station II of the transfer mechanism, said nozzle being formed with an annular passage and discharge apertures opening through the inner wall of the nozzle, as shown in Fig. 2. Lubricant conduit 38 is connected to communicate with the nozzle passage, as indicated diagrammtically in Fig. 2, so that discharge actuation of the lubricating pump effects discharge of lubricant on the threaded end of a pipe disposed within the nozzle. As will later appear, a pipe section deposited on the live rollers 14, 14 of the transfer mechanism is advanced endwise by the rollers until the end of the pipe engages bracket plate 25 and stops in that position. By adjustment of the pump cylinder 28 mentioned above the amount of lubricant discharged on the pipe threads can be varied to suit the size of the pipe.

To provide for reverse movement of the pipe section from nozzle 39 a plunger 40 is slidably mounted in brackets 25, 26 in position to engage the end of a pipe disposed within the nozzle 39. At its rear end plunger 40 has a lost motion connection at 41 with the pump slide 32, said connection being such that on the advance movement of slide 32, the lost motion of the connection is taken up during the discharge stroke of the pump plunger 29 and the further movement of slide 32 effects a withdrawal movement of the pipe in station II from the socket of nozzle 39 to the position shown in Fig. 1 where it is free for lateral movement to station III. At the end of this movement of slide 32 an adjustable contact screw 42 carried by it moves limit switch LS10 so as to effect necessary conditioning of electric circuit control means for movement of the pipe section in station II to station III.

To guide the end of a pipe section P2 into suitable engagement with nozzle 39 an idler roller 43 is mounted in front of the lubricator frame 24 on a frame section 44 supported by base frame 23. To obviate unduly rapid movement of the pipe section entering the lubricant nozzle 39, flag switch cam arm 45, which actuates switch LS8 (Fig. 26) in the circuit of motor 16, is mounted on stand housing 6 adjacent the lubricating mechanism and in a position below the pipe section to be engaged thereby, as indicated in Fig. 3, to actuate switch LS8 and reduce the speed of the said motors in a manner hereinafter explained.

*Coupling starting mechanism*

The coupling starting mechanism 2 is disposed on the base frame 23 in alignment with station III of the apparatus. This mechanism comprises a feed chute 46 for couplings which is conveniently supported in suitably inclined position on the inclined top 24a of the lubricator frame 24, the bottom of the chute being fitted with bent brackets 46a, 46a which removably engage straps 47, 47 attached to the frame top 24a, so that chutes for couplings of different sizes can be mounted interchangeably. The pipe couplings are introduced transversely in the open top end of chute 46 to move laterally to the lower end thereof where the rear and front walls of the chute are cut away at 46b and 46c to permit free access to the interior of the bottom coupling. The front wall of the chute 46 is also apertured at 46d opposite the second coupling from the bottom (Fig. 11) and in line with a compressed-air blast nozzle 48 mounted on the rear wall of chute 46. A conduit 48a controlled by valve 49 supplies air to the nozzle to clear chips from the couplings in their movement past the nozzle, the valve 49 being operated automatically by means to be described. At its lower end chute 46 carries an insulated electric contact 50 connected in a later-mentioned control circuit which is closed through the ground by the presence of a coupling in engagement with the contact and the chute.

The starting mechanism 2 further comprises a ram and spindle mechanism having a carriage consisting of a frame 51 (Figs. 1, 13), rod 52 rigidly connected to frame 51 and a second rod 53 rotatably mounted in the arms of frame 51 but secured against longtiudinal movement therein by rings 54 which are pinned to rod 53. The carriage thus constituted has is rods 52 and 53 slidably supported in bearings of front and rear pillow blocks 55, 56 secured to base frame 23.

The carriage structure is reciprocated in the pillow blocks 55, 56 by a pair of conventional reciprocating hydraulic motors 57 and 58. Motor 57 has its cylinder secured to base frame 23 while the cylinder of motor 58 is attached to carriage frame 51; and the piston rods of the two motors are coupled together so that the motors function additively or in tandem to move the carriage structure relative to the bed frame.

An elongated ram casing 59 is formed with arms 59a and 59b which are mounted on carriage rod 53. Hence the casing 59 can move endwise with the carriage structure and can swing with rod 53 about the rod axis. To effect such swinging movement a bell crank 60 is mounted on the rod 53 between the arms of pillow block 56 (Figs. 5 and 12) and with the arms of the crank embracing the body of the casing 59. Anti-friction rollers 61 are mounted on the ends of the bell crank and engage hardened steel rails 62 attached to casing 59 and extending lengthwise thereof. A hydraulic motor 63 attached to base frame 23 and connected to bell crank 60 serves to swing the bell crank, and with it ram casing 59, under control of solenoid valve ST. The bell crank 60 carries a contact arm 64 arranged to engage an adjustable stop screw 65 to limit the angular movement of the crank in one direction while its movement in the opposite direction is limited by contact button 56a on pillow block 56.

Both the longitudinal and swinging movements of the ram mechanism are utilized for control purposes. Bar 51a secured to the arms of carriage frame 51 in turn supports adjustable contact blocks or dogs 51b, 51c and 51d which are arranged to cooperate with limit switches LS2 and LS13 (Fig. 13) in a manner later described. As shown in Fig. 10 the front arm 59a of ram casing 59 carries dogs 59c and 59d which cooperate with limit switch LS1 and also carries cam 59e which serves to actuate the compressed air valve 49.

At its rear end the ram casing is formed with a gear housing 59f which is provided with a cover plate 66 (Fig. 12). A hollow spindle 67 is housed in casing 59 and rotatably supported on roller bearings 68 and 69, the former being of the thrust type. A spur gear 70 which is fast on the rear end of spindle 67 is driven by electric motor 71 mounted on cover plate 66 and operatively connected to gear 70 by pinion 72 on the motor shaft. During operation of the apparatus motor 71 may run continuously.

A sleeve 73 which is rigidly mounted in the front end of spindle 67 encloses a chuck carrier 74 which is formed with a forwardly tapering surface 74a to cooperate with a mating interior surface in the front end of sleeve 73. At its rear end the carrier 74 is formed with a narrow circumferential land 74b which engages the inner cylindrical surface of sleeve 73. Carrier 74 is fitted with a pin 75 that engages a longitudinal slot in sleeve 73 and thus prevents relative rotation of the carrier in the sleeve while permitting their relative longitudinal movement. Coil spring 76 which is interposed between collar 77 and the rear end of carrier 74 maintains the latter yieldingly in contact with the inner tapered surface of the sleeve 73. By the yielding of spring 76 the tapered surface of carrier 74 may separate from the mating surface of the sleeve and permit a limited lateral movement of the front end of the carrier while the latter rotates with the spindle. What may be termed a floating support is thus provided for the carrier.

On the front end of carrier 74 is detachably mounted an expandable chuck (Fig. 6) comprising a mandrel body 78, one or more radially movable balls 79 and plunger 80. The clutch body 78 is formed with a major diameter 78a designed to fit within the pipe couplings to be assembled, a minor diameter 78b of a size to fit within the ends of the pipes to be handled, and with a front taper 78c which serves to pilot the chuck into the coupling and pipe. The plunger 80 is formed with a tapered portion 80a which permits the ball 79 to move inward when the plunger is moved forward against the pressure of biasing spring 81 but acts as a cam to press the ball outward when the spring moves the plunger rearward.

For controlling the position of the chuck plunger 80 from the rear end of the ram means are provided in the form of a small thrust rod 82 slidably mounted in the chuck carrier 74 and a long thrust rod 83 slidably supported in spindle 67. Head 84 fast on the rear end of rod 83 is engaged by biasing spring 85 which normally holds thrust rod 83 in inoperative position with respect to rod 82 and chuck plunger 80. To effect forward movement of rod 83 its rear end is fitted with an anti-friction bearing 86 the outer race of which carries a cup 87 arranged to be engaged by hydraulic plunger 88 mounted in motor cylinder 89 attached to cover plate 66. Working fluid is transmitted to cylinder 89 under control of solenoid valve SR to actuate thrust rods 83, 82 and chuck plunger 80 when the chuck is to be collapsed.

In the operation of the starting mechanism 2 the ram casing 59 is initially in the inclined position shown in Fig. 1 with the ram chuck in a position to enter a coupling in the bottom of the feed chute 46 when motor 57 moves the ram forward. Thereafter the motor 63 (Fig. 5) is energized to swing the ram to its vertical position whereupon motor 58 is actuated to advance the ram until the coupling carried by the coupling chuck engages the front end of pipe P3 resting on supports 18 in station III.

To hold the pipe in station III in fixed position while the coupling is applied thereto a pipe chuck is provided which may be of any type of construction suitable for the purpose. As shown in Figs. 1 and 4 this chuck, generally designated 90, is of the magnetic type and comprises a U-shaped core frame 91, pole pieces 92, 92 having inclined faces to receive and laterally locate the pipe. The chuck is energized by coil 93 and is supported by slide 94 carried by a support 95 attached to the frame 44, slide 94 being vertically adjustable to adapt the chuck to pipes of different diameters. When a pipe is transferred from station II to station III it is deposited upon the chuck 90 and the adjustable supports 18 on the stands 5.

Following application of a coupling to the pipe in station III, the ram is retracted by operation of motors 57 and 58 and swung by motor 63 to its initial inclined position. Then the pipe in station III, with its applied coupling, is advanced by the transfer mechanism to station IV where it is deposited upon live rolls 15, 15. These rolls, turning continuously at slow speed, advance the pipe endwise into engagement with a stop 96 supported on a post 97 which is attached to the main frame of the tightening mechanism 3. This stop is arranged in suitable relation to the latter mechanism and in a position advanced in relation to the magnetic chuck 90 so that a sufficient endwise positioning movement of the pipe is provided to accommodate pipe couplings of different lengths.

*Tightening mechanism*

As shown in Figs. 14 and 15 the tightening mechanism 3 comprises a main frame 98, the sides of which are fitted with top side rails 99, 99. On the front end of the base frame is mounted a pipe chuck 100 and to the rear of this chuck is arranged a coupling chuck 101.

The pipe chuck comprises a carriage base frame 102 which is formed with channels and wear strips to slidably engage the top rails 99 of the main frame 98 in conventional manner, as shown in Fig. 15. Frame 102 is provided with bottom flanges 102a which slidably engage a guide rail 103 rigidly supported on frame 98 so as to maintain the chuck frame in accurate alignment with the axis of the chuck 101. The carriage frame of chuck 100 further comprises the top section 104 which covers the chamber within the base 102 and is formed with upstanding guides 104a for the chuck slides 105. Each of the slides 105 is fitted with a detachable jaw 106 so that the jaws may be changed to accommodate pipe sections of different diameters.

The chuck slides 105 are actuated by a conventional hydraulic motor 107 arranged within the chamber of the chuck framework and operatively connected with the chuck slides by a three-armed bell crank 108 and conventional links and levers as indicated in Figs. 14 and 15.

The motor 107 is controlled by a four-way valve 109 which is actuated hydraulically under control of solenoid valves SA1 and SA2.

One of the chuck slides 105 is fitted with a dog 110 arranged to actuate limit switches LS5 and LS11 for control purposes to be described later.

The carriage of chuck 100 is bodily moved on the top rails of main frame 98 by means of hydraulic motor 111, the piston rod of which is connected to bracket 102a on chuck frame 102. To effect forward movement of chuck 100 toward chuck 101 working fluid is admitted to the front end of motor 111 by solenoid valve SB3, with the fluid flow under the control of a conventional throttle valve 112 which is actuated by cam 113 carried by the chuck frame 102. Solenoid valve SB4 controls admission of working fluid to the rear end of motor cylinder 111. The chuck frame 102 also carries a depending dog 114 which actuates limit switches LS4 and LS12, for control purposes hereinafter pointed out.

The coupling chuck 101 has a frame 115 fixedly supported on the rails 99 of main frame 98. In this chuck frame a hollow spindle 116 is rotatably supported in roller bearings 117, 117 of the thrust-taking type. The spindle is driven by a transversely arranged shaft 118 through worm 119 on said shaft and a cooperating worm wheel 120 fixed on the spindle. Shaft 118, which is rotatably supported in non-thrust roller bearings 121, 121 and a thrust-taking ball bearing generally designated by 122 (Fig. 17), is driven by motor 123 adjustably supported on the frame 115. The motor operatively connected with the drive shaft by conventional belt and pulley means generally designated by the numeral 124. Motor 123 runs continuously during operation of the apparatus.

The chuck proper of the mechanism 101 comprises a cylindrical block 125 rigidly bolted to the front end of spindle 116. This block 125 is formed with a plurality of radial slots in which are mounted slides 126 which carry jaws 127 designed to grip the pipe couplings. By substituting jaws of different lengths couplings of different diameters can be accommodated. An annular plate 128 secured to head block 125 serves to hold the slides 126 in working position. The outer ends of the slides have tongue and groove cam formations to cooperate with tongue and groove cam blocks 129 secured on the inner side of a flanged ring 130 which slidably engages the outer periphery of head 125 and is rigidly attached to spokes 131a of an actuating slide 131 which is axially arranged in the major bore of spindle 116. The spokes 131a extend through slots 116a in spindle 116 so that rotation of the spindle is transmitted to the cam ring 130 through the spokes, causing the ring and block 125 to rotate together.

Axial movement of slide 131 serves to move the chuck jaws 126 outward and inward in well-known manner and such movement of the slide is effected by hydraulic motor 132 which is fixedly attached to the rear end of spindle 116 to rotate therewith and has its piston rod 132a operatively connected to the slide 131. Working fluid is admitted on either side of the piston of motor 132 through a stationary stuffing box 133 of conventional type under control of solenoid valve SD.

The ball bearing 122 of worm shaft 118 has its inner ball races arranged to receive the axial thrust of the worm shaft from a collar 118a of the shaft. The outer ball races of the bearing are supported in a shell 134 and the thrust transmitted to them through the bearing balls is in turn transmitted to a cap 135 connected by screws to shell 134. A dependent torque arm 136 has its upper end pivotally mounted on pin 137 which is supported from frame 115. The torque arm thus supported is arranged to receive the axial thrust of shaft 118 through hardened steel buttons 138 and 139 carried respectively by cap 135 and arm 136.

The lower end of torque arm 136 is arranged to cooperate with a threaded rod 140, the arm being drilled to permit free passage of the rod therethrough and cross-drilled to fit a trunnion 141 which also is drilled to receive rod 140. A collar 142 pinned on rod 140 engages the flattended side of trunnion 141. The threaded portion of rod 140 extends into a slotted tubular case 143 carried by plate 144 which is attached to frame structure 115. Nut 145 engages the threads of rod 139 and a coil spring 146 is interposed between the nut and plate 144. Nut 145 is formed with a wing 145a which extends through the longitudinal slot of case 143 and carries a graduated rod 147 arranged to extend through aperture 144a in plate 144 so that its graduations indicate the extent of the compression of spring 146 when torque arm 136 is moved by the thrust of worm shaft 118. To provide for adjustment of the tension of spring 146 the outer end of rod 140 is squared to receive a wrench; and a pivoted detent 148 attached to the lower end of arm 136 is notched on one side to engage the squared end of rod 140 to hold it in adjusted position. By adjustment of rod 140 the resistance of spring 146 can be varied to determine the torque at which arm 136 will yield.

The torque arm 136 carries an adjustable contact screw 149 to cooperate with switch LS9, the contact screw, when urged by spring 146, serving to move the switch in its opening direction, while the switch is spring-actuated in the closing direction. The rod 140 is formed with a collar 140a which is arranged to positively close a spring-opened limit switch LS91 when torque arm 136 is moved, against the tension of spring 146, by the thrust of shaft 118. The contact screw 149 is adjusted to permit spring closure of switch LS9 a little before collar 140a engages switch LS91, the latter switch normally remaining open unless the switch LS9 should fail to close.

The actuation of the limit switches LS9 and LS91 by movement of torque arm 136 serves, in a manner later described, to terminate the coupling-tightening operation of the machine. It will be understood that the adjustment of the resistance spring 146 adapts the torsion mechanism to operation on couplings of different sizes, the screw-up torsion suitable increasing with the size of the coupling.

*Control system*

The automatic control of the entire apparatus is effected to a large extent by electric devices, most of which have been mentioned and all of which are shown in the diagrams of Figs. 25 and 26, the former figure showing chiefly the controls of the lubricating, starting and tightening mechanisms while the latter one shows chiefly the controls of the pipe transfer mechanism.

The symbols employed in Figs. 25 and 26 are conventional and the diagrams will be understood without detailed description. It will be observed that each of the diagrams comprises A. C. and D. C. circuits, the former indicated by single lines and the latter by double lines. In both diagrams the A. C. circuits are connected across lines L1 and L3 of a single phase system and comprise additional lines La, Lb and Lc which at various stages in the operation are energized by connection across lines L1 and L3. The direct current circuits of both diagrams are connected across D. C. terminals and comprise a line Ld automatically connectable across the terminals to energize the pipe chuck of the starting mechanism. Fig. 25 shows the coupling feed chute 46 and contact 50 connected in a low voltage circuit energized by a step-down transformer connected across lines L1 and L3. Limit switches actuated automatically are designated by the letters LS. Other switches shown are manually operated. Some of the limit switches are spring actuated in one direction and positively actuated in the opposite direction, the representation of these switches in the wiring diagrams including a conventional spring. Switches LS2 and LS13 have snap action and are actuated positively in both directions. Control relays are designated by the letters CR and have their contacts, or a majority of them, closed when their coils are energized. Solenoid actuated valves of fluid pressure motors are designated by the letter S followed by distinguishing letters, A, B, C, etc. Some are 3-way and some 4-way valves. When their coils are energized they may connect their motors either to pressure source or to exhaust, according to the way their ports are connected.

In the preferred form of the pipe transfer mechanism 4 the shifters 9 for moving the pipes laterally from station to station are actuated by hydraulic motors (not shown herein) which are started by a solenoid valve designated SS (Fig. 26). Valve SS is energized to start the hydraulic motors referred to when the control circuit is conditioned by the operation of certain parts of the apparatus, as hereinafter described. The cams 7b, 8b (Figs. 1 and 26) of the transfer mechanism, which partake of the single-rotation movement of the latter, actuate limit switches LS6 and LS7, respectively, as later described.

*Operation*

In describing the operation of the apparatus it may be noted that although, due to previous operation of the apparatus, a pipe section is present in each of the five stations as shown in Figs. 1 and 2, the description will now follow only the operations upon pipe P1, starting in station I and progressing through the several stations. It is observed that in Fig. 1 the pipe P1 is shown in the endwise position which it chances to occupy on the feeding skids 20 while pipes P2 to P5 occupy positions established by the pipe shifters 9, plus live rolls 14, 15 in the case of stations II and IV.

In normal operation, the control circuits having been conditioned by completion of the last preceding operations of mechanisms 1, 2 and 3, the coil of valve SS is energized to start the pipe shifters 9 from their position of rest shown in Fig. 9 to effect a single-rotation movement which lifts pipe P1 in station I and deposits it on the rollers 14, 14 driven by motors 16. The fields of said motors are at all times connected across the D. C. terminals and at this time their armatures are similarly connected through control relay CRQ, so that the motors operate at full speed. Thus the pipe deposited in station II rapidly advances endwise until its end engages the flag switch arm 45 which opens switch LS8 breaking the coil circuit of relay CRQ and causing the top contacts of this relay to open. This in turn causes current from the D. C. supply line to flow through the resistance shown to the motor armatures thus causing the motors to turn at reduced speed. Simultaneously with the opening of the upper contacts of relay CRQ its lower contacts close. This completes a circuit through the solenoid coil of time-delay relay TD1 which, after a brief interval opens its upper contacts and deenergizes the coil of relay CRP. This opens the upper contacts of relay CRP, breaking the D. C. circuit of motors 16 and causing them to stop. Simultaneously with the opening of the upper contacts of relay TD1 its lower contacts are closed to energize valve SP and cause motor 33 to advance the cam slide 32 of the lubricator pump mechanism and effect discharge of lubricant upon the pipe threads and also to advance the plunger 40 and move the pipe rearward into position for its lateral movement without interference with the lubricant nozzle. At the end of the movement of slide 32 its contact 42 closes limit switch LS10, thus conditioning the control circuits, in so far as the lubricating mechanism is concerned, for the next operation of transfer mechanism 4.

Another actuation of valve SS now initiates a second movement of the transfer mechanism and starts movement of pipe P1 from station II to station III. At this time the solenoid of relay CR1 is energized through line La, switch LS6 of the transfer table and switch LS2. As the transfer mechanism starts its rotary movement from the position shown in Fig. 9, line La is deenergized (by opening of switch LS6), thus deenergizing relay CR1 and opening its two upper contacts and closing its lower contacts.

With a coupling in place in the bottom of chute 46, a circuit is completed through contact 50 to the ground, thus energizing and closing sensitive relay CRS (Fig. 25). With the starter ram in its inclined position, dog 59d has lowered limit switch LS1 completing a circuit through control relays CRS and CR1 to energize the coil of relay CR2 and close the three sets of contacts of the latter. The lower contact completes a circuit which energizes solenoid valve SB2 to energize motor 57 and cause coupling mandrel 78 to advance into the bottom coupling in the feed chute, this coupling having been cleared of chips by previous activation of the ram, as will presently appear.

As the motor 57 approaches the end of its forward stroke, dog 51c lifts limit switch LS13 to the position shown (Fig. 25). This deenergizes solenoid valve ST and causes motor 63 to swing the starter ram to its vertical position, carrying the coupling on mandrel 78 with it. The said lifting of switch LS13 also closes the circuit through the coil of valve SR which opens cylinder 89 to exhaust and permits the rotating arbor chuck to expand and grip the coupling.

As the starter ram swings to its vertical position, dog 59c engages switch LS1 and moves it to the position shown in Fig. 25. Meanwhile the coil of relay CR2 remains energized through the lower contacts of switch LS2, upper contacts of CR2 and lower contacts of CR1. While the lower contacts of switch LS1 and the middle contacts of relay CR2 are closed in the line La circuit, said circuit is not energized until a pipe is placed in position by the transfer mechanism. As the transfer mechanism deposits the pipe in station III the high zone of cam 7b closes the upper contacts of switch LS6 (Fig. 26) and energizes valve SB1. This causes hydraulic motor 58 to advance the coupling toward the pipe. As the coupling approaches the pipe, the tapered end of the arbor chuck enters the end of the pipe to bring the chuck and coupling thereon into approximate alignment with the pipe. This is permitted, notwithstanding the usual departure of the pipe from straightness, by the previously described yieldable mounting of the chuck carrier 74 which provides the necessary lateral floating movement of the chuck arbor until the threads of the rotating coupling operatively engage the threads of the pipe, whereupon the coupling is screwed up until the chuck slips in the coupling. It will be noted that the expandable ball element of the chuck is so disposed lengthwise of the mandrel that the ball engages the coupling midway of its ends and any mashing of the coupling thread at this point does no harm.

In the forward movement of the piston of motor 58, the arm of switch LS13, having been moved forward by the front end of dog 51c, rides over the face of the dog until the end of the movement, at which time switch LS2 is lowered by dog 51b. Lowering of switch LS2 deenergizes relay CR2, opening its three contacts. A result of this is to deenergize valve SR and collapse the mandrel chuck. Further results are to deenergize valve SB2 and start the return of motor 57 and to deenergize valve SB1 and start the return of motor 58. Another effect of the lowering of switch LS2 is to energize the coil of relay CR1 and close two of its contacts, this condition being maintained until the next actuation of the transfer mechanism, when line La is deenergized by transfer switch LS6.

As the ram 59 approaches the midpoint of its return stroke and coupling chuck 78 is clear of the coupling, the rear end of dog 51c (Fig. 13) raises switch LS2 and conditions the control circuit, in so far as the starter unit is concerned, to permit initiation of the next succeeding pipe transfer cycle. When auxiliary conditioning of the control circuit indicates that a following pipe is free of the lubricator, as previously described, and that the preceding pipe is ready to be transferred from the tightening unit 3, valve SS can again be energized to cause the pipe in station III to start toward station IV.

As the starter ram continues its return stroke, the roller of switch LS2 continues to ride along the side surface of dog 51c, and at the end of the return stroke, dog 51d contacts the roller of switch LS13 to move it downward (Fig. 13). This completes a circuit through the upper contact of the switch to energize valve ST to cause the starter ram to swing to its 45° position ready for the next succeeding cycle of its operation, and in this movement of the ram dog 59d lowers switch LS1, closing its upper contact and opening the lower one. Also during the last mentioned swinging movement of the ram the cam 59e carried by the ram engages and opens the air valve 49 to supply compressed air to nozzle 48 and blast metal chips from the threads of the next to the lowest coupling in the chute 46. In this manner each coupling is freed of chips before assembly.

On the next movement of the transfer mechanism, initiated by energizing of valve SS, pipe P1 with its applied coupling is transferred from station III to station IV where it is deposited on live rolls 15, 15 which are continuously driven at slow speed by motors 16', 16', in a direction to advance a deposited pipe section toward the stop 96. The effect of this is simply to suitably position the pipe section endwise for transfer to the tightening mechanism 3. As will be apparent from Fig. 26, the automatic control devices of the apparatus are unaffected by this endwise positioning operation in station IV.

On the fourth actuation of the transfer mechanism pipe P1 is shifted from station IV to the idle rolls 19, 19, in axial alignment with the pipe and coupling chucks of the tightening mechanism. As the pipe is lowered into position on rolls 19, 19, it enters between the jaws of the pipe chuck 100. At this time line La is energized and with relay CR4 deenergized the line La circuit is completed through valve SA1 to actuate four-way valve 109 and close the chuck. This causes dog 110 to release the limit switch LS5, permitting its opening and by the same movement to engage and close switch LS11. The closing of switch LS11 completes a circuit through switch LS12 to energize valve SB3. This admits pressure fluid to the front end of motor 111 to slide chuck 100 toward chuck 101 and bring the coupling of pipe P1 within the jaws of the latter rotating chuck.

As the coupling enters the rotating chuck, dog 114 moves switch LS12 down, thus opening its lower contact and deenergizing valve SB3 and stopping the forward movement of the pipe chuck 100. Meanwhile the closing of the upper contacts of switch LS12 closes a circuit through bottom contacts of switch LS9 to energize valve SD. This actuates motor 132 to effect closure of the rotating chuck and starts the tightening of the coupling on the pipe. When the proper tightening torque is reached switch LS9 is lowered by its closing spring or, should the closing spring fail to function, switch LS91 is positively closed. In either case valve SD is energized to open the grips of the rotating chuck and at the same time energizes the solenoid of relay CR4, closing its upper and middle contacts and opening its bottom contact. The opening of the bottom contacts deenergizes valve SA1 to remove pilot pressure from four-way valve 109. The circuit through the middle contact of CR4 is interrupted at switch LS5, while the upper contact of CR4 maintains CR4 energized. Valve SB4, energized with the energizing of relay CR4, causes motor 111 to retract carriage of pipe chuck 100 to withdraw the coupling from the rotating chuck 101.

As the carriage of chuck 100 reaches its extreme return position dog 114 operates switch LS4 to close the circuit through coil of valve SA2 to shift four-way valve 109 to open the jaws of chuck 100. As the jaws open dog 110 first releases and opens switch LS11 and, as the chuck is fully opened, engages and closes switch LS5. The circuit thus closed at LS5 is shown (Fig. 25) interrupted at switch LS10 of the lubricator mechanism, but it will be recalled that switch LS10 is closed by the final movement of the lubricator mechanism that ejects the pipe therein from the lubricator nozzle.

The pipe P1 with its fully tightened coupling having been freed by the opening of chuck 100, on the next actuation of the transfer mechanism is lifted from station V and deposited upon the inclined discharge skids 22.

It has been pointed out that in each operating cycle of the apparatus the operation of each of the lubricating, starting and tightening mechanisms conditions the control system of the apparatus in a manner to insure completion of the operation of each of said mechanisms before the single rotation movement of the transfer mechanism can be initiated for the following cycle by the energizing of valve SS. It will now be apparent that the last of the three mechanisms to complete its operation and conditioning of the control means, which ordinarily is the tightening mechanism, serves in effect to signal the starting of the transfer mechanism.

It will be apparent from the foregoing description that the lubricating, coupling starting, coupling tightening and pipe transfer mechanisms, operating subject to the interdependent devices of the control system, constitute, with the control system, a unitary apparatus capable of continuous automatic operation. Furthermore, by performing the necessary work of assembly in several stages carried out simultaneously on a plurality of assemblies in separate stations, the overall time per assembly for the operation is minimized and the cost of the operation per assembly correspondingly reduced.

It will be seen also that the provision of separate mechanisms for starting the assembly of the couplings on the pipes and for tightening the couplings, makes it feasible to employ for the first purpose a mandrel type of chuck well suited to the functions of picking up the coupling and applying it to the pipe thread while the second purpose is performed by a different (female) type of chuck better suited to exert the higher torque required for tightening.

In the course of the foregoing description reference has been made to the adjustability or the interchangeable character of various parts of the apparatus and it will be understood that these features adapt a single apparatus to handle a considerable range of pipe sizes.

Alternative forms of construction

It will readily be understood that various alternative forms of construction can be employed to perform the necessary functions of various parts of the apparatus. For example, lubricating mechanism can be used that is designed to apply the lubricant to the coupling instead of the pipe, and various alternative forms of the chuck devices can be substituted for those described above. In the case of the starter mechanism various other forms of expandable mandrel construction can be employed. Or a form of mandrel chuck can be used in which magnetic holding means is used in lieu of the hydraulically actuated mechanical gripping means of the starter chuck which has been described. By way of illustration, some of the alternative constructions contemplated have been shown in the drawings and will now be briefly described.

In Figs. 7 and 8 is shown a magnetic type of mandrel coupling chuck having a mandrel carrier 150 similar to that in the first described construction except that the axial bore of the latter is omitted. On the front end of the carrier is screwed a mandrel core member 151 formed of non-magnetic metal. On this member is fixedly secured a bi-polar permanent magnet member 152 and a mandrel sleeve 153, also of non-magnetic material. Sleeve 153 is formed with a major diameter to fit within the couplings to be handled, a minor diameter to fit within the ends of the pipes to be handled, and a tapered front end. When a coupling is passed over the mandrel sleeve and engages the pole faces of the permanent magnet 152 it is held yieldingly against rotation in relation to the magnet. With the magnetic form of chuck, the thrust rods 82 and 83 of the first described construction, as well as the hydraulic means for actuating thrust rod 83, are not needed.

Figs. 22–24 show a mechanical form of pipe chuck suitable for use with the starting mechanism in lieu of the magnetic chuck 90. The mechanical chuck comprises a frame structure 154 formed with ways for slides 155, 156 which carry removable jaws 157. Racks 158, 159 are mounted on the slides 155, 156, respectively, to be driven by a pinion 160 which is fast on shaft 161. This shaft in turn is actuated by hydraulic motor 162 which can be controlled by solenoid valve and limit switch devices to close and open the jaws of the chuck in suitable timed relation to the deposit of the lubricated pipe in the chuck and its removal therefrom.

As hereinbefore noted, lubricant can be applied either to the pipe threads or to the coupling threads. Figs. 27 to 30, inclusive, show a form of lubricating mechanism in which the lubricant is sprayed by compressed air on the coupling threads. In this construction the starter ram serves as a movable support for the spray nozzle. Aside from this, the starter mechanism itself is substantially the same in the modified construction as in the first described apparatus. Accordingly, the same reference numerals applied to various parts of the latter apparatus are applied to the similar parts in Figs. 27–30.

In the modified construction a lubricant spray gun 163 of known type is mounted on one side of the ram casing 59 at the front end thereof and in a position relative to the swinging axis of the ram, in advance (clockwise) of the mandrel chuck 78. As such guns are commercially available (e. g. the "Type AGA" gun made by the De Vilbiss Company of Toledo, Ohio), the more or less diagrammatic showing of the gun and its appurtenances, with the description which follows, will suffice for a clear understanding of the modified construction.

The gun comprises a body 164 and an elongated nozzle 165 having an axial lubricant passage 166 with a valve seat 167 at its front end controlled by a needle valve 168 which extends back through the nozzle and the body to connect with a piston 169 in a compressed-air cylinder 170 carried by body 164. A spring 171 in the cylinder holds the needle valve yieldably in closed position. The gun body 164 has a lubricant inlet conduit 172 that communicates with the rear end of passage 166.

The nozzle 165 also has a longitudinal compressed-air passage 173 which surrounds passage 166 and communicates at its rear end with an air chamber 174 in the gun body. The two passages 166 and 173 merge on the outlet side of the needle-valve seat 167 to discharge atomized lubricant through the annular outlet of the nozzle. The compressed air is supplied to the gun nozzle through an opening at 175 in body 164. This opening communicates, under control of spring-biased valve 176 with air chamber 174 which in turn opens into passage 173. Valve 176, which is yieldingly held in closed position by its spring, has a cross connection to the needle valve so that rearward movement of piston 169 opens both the lubricant valve and the air valve.

Figure 30:
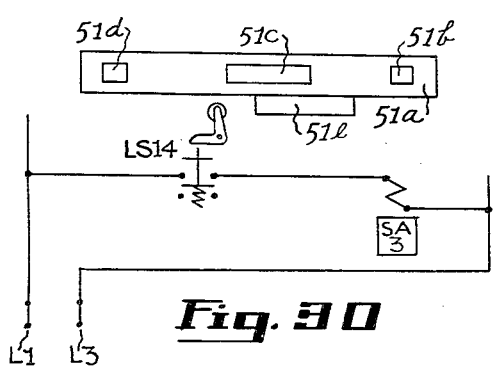
Fig. 30 is an electrical diagram showing control means for the lubricating devices shown in Fig. 29.

Lubricant of suitable consistency is supplied to the gun inlet 172 through flexible conduit 177 which connects with the bottom of container 178 holding lubricant under compressed air pressure. Compressed air, from a suitable source, is supplied through conduit 179 which divides, with branch 179a leading to the air cylinder 170 and controlled by solenoid valve SA3 and with branch 179b leading to the gun air inlet 175 and subject to pressure regulator 180. Valve SA3 is energized through switch LS14 which is actuated by a dog 51e mounted on bar 51a (Fig. 30). Since movement of bar 51a is determined by the longitudinal movements of the starting ram (Fig. 13), which are controlled by the means and in the manner already described, the control switch LS14 and valve SA3 may be connected (as shown in Fig. 30) in series directly across the lines L1 and L3 and independently of the other control devices of the system.

In the modified construction, as in that first described, the frame 24 supports the coupling feed chute 46, but, with the omission of the cam-actuated lubricant pump and the nozzle 39 of the first form of apparatus, bracket plates 25 and 26 of the first apparatus become unnecessary except for the pipe-stopping function of bracket 25. Accordingly, in the modified construction, frame 24 is fitted with a modified form of plate 181 to serve as pipe stop in station II of the apparatus.

The modified construction also involves positioning of compressed air valve 49 adjacent the rear arm 59b of ram casing 59 and the mounting of cam 59e on said rear arm.

With two exceptions, control devices for the apparatus with modified lubricating means, are the same as for the first form of construction. The first exception is that switch LS10 is omitted, along with the lubrication pump mechanism of the first form of construction. It will be observed in Fig. 25 that switch LS10 is connected in series with switch LS5, so that omission of switch LS10 involves merely direct connection of switch LS5 with line Lc. As will presently more fully appear, the operation of the modified lubricating mechanism is dependent entirely upon and determined by the movements of the starter ram; and hence the control system conditioning function of switch LS10 of the first construction is not required in the modified system.

The second exception referred to is the provision of the solenoid valve SA3 and its control switch LS14, which are connected in series across the lines L1 and L3 (as shown in Fig. 30), without modifying the operation of the remainder of the control system.

In the operation of the modified apparatus, the first operation of the transfer mechanism lifts the pipe from station I and deposits it on live rollers 14 in station II, where the rotation of the rollers, as previously described, advances the pipe endwise, first at full speed and then at slow speed, until its front end engags the pipe stop 181 mounted on frame 24. The actuation of the transfer mechanism initiates movements of the starter mechanism and the tightening mechanism in a manner previously described. Following the progress of the same pipe, the second actuation of the transfer mechanism shifts the pipe from station II to station III. At the beginning of this second movement of the transfer mechanism the starter ram is in its fully retracted and inclined (45°) position shown in Fig. 1 with the mandrel chuck 78 in axial alignment with the lowermost coupling in the feed chute 46. (As will shortly appear this coupling will have been lubricated in the last preceeding operating cycle of the machine.) In this position of the ram the spray gun 163 is disposed at a level below the lower end of chute 46 and with the front end of the nozzle 165 to the rear of the chute by the distance indicated in Fig. 27.

With the starting of the last mentioned movement of the pipe transfer mechanism the cycle of movements of the starter mechanism 2 is initiated and carried through in the manner previously described in connection with the first form of construction. That is to say, the ram 59 is advanced to move the mandrel chuck 78 into the lowermost coupling in the chute 46, at the same time advancing the spray gun toward the chute until the front end of its nozzle is just short of the rear side of the chute. Next the ram is swung upward to its vertical position, carrying the bottom coupling with it and permitting the next coupling to move downward in the chute and replace the one removed. This angular movement of the ram brings the nozzle of the spray gun 163 into axial alignment with the dechipped coupling which was advanced to the bottom of the chute. Thus in the further forward movement of the ram (effected by motor 58) to advance the coupling into engagement with the end of the pipe in station III, the nozzle 165 of the spray gun is advanced into the bottom coupling in the chute. As the front end of the nozzle enters within the coupling, the front end of switch dog 51e on bar 51a engages the arm of spring-biased switch LS14 (Fig. 30) to energize solenoid valve SA3 and admit compressed air into the front end of motor cylinder 170. This retracts the motor piston 169, opening needle valve 168 and compressed air valve 176, thus starting the discharge of atomized lubricant on the inner threaded surface of the coupling.

As the spray nozzle advance through the coupling the arm of the switch LS14 rides on the side surface of the side surface of the elongated dog 51e, holding the switch in closed position. At the end of the return movement of the ram, which now follows, the spring biased switch arm is released from the dog, the switch is opened and the valve SA3 de-energized and opened to exhaust to permit forward movement of the spring-biased motor piston 169 and the closing of both the lubricant valve 168 and the air valve 176.

Following the full rearward or return movement of the ram, it swung down to its 45° position ready for a repetition of the cycle of movements just described, upon the next actuation of the pipe transfer mechanism, and during this last swinging movement of the ram the cam 59e acts to energize the compressed air nozzle 48 in the manner previously described, to free the threads of the next to the bottom coupling of chips.

It will thus be seen that as one coupling is picked up from the bottom of chute 46 and applied to the end of the pipe section for assembly thereon, the lubricating mechanism applies lubricant to the next following chip-free coupling in preparation for its application to the next following pipe section. Also, it will be apparent that the movements and the valve control of the lubricating mechanism are determined entirely by the movements of the starter mechanism, as previously mentioned, so that the devices provided for the control of the starter mechanism serve to control the movement and operation of the lubricating mechanism, except for the switch LS14 and the valve SA3.

It may be pointed out that the modified form of lubricating mechanism has one advantage not possessed by the first-described form, namely, that it applies lubricant to the entire threaded surfaces of the coupling, so that the part of the threaded surfaces which does not engage the threads of the pipe on which the coupling is assembled are protected by the lubricant during the shipment of the pipe and until the pipe is connected up in use.

Examples of alternative forms of construction need not be further multiplied since it will be apparent to those skilled in the art that in the carrying out of the invention various parts of the apparatus may be replaced with other equivalent forms of construction, within the bounds of the appended claims.

What is claimed is:

1. Threaded pipe and coupling assembling apparatus comprising means for advancing individual pipe elements and coupling elements to an initial place of assembly; means arranged at the said place of assembly for starting the application of a coupling element on the threads of a pipe element including a pipe chuck, a coupling chuck comprising a rotatable mandrel formed to enter and fit within a coupling, means cooperating with the mandrel for frictionally gripping and yieldably driving a coupling positioned on the mandrel, means comprising a resiliently yieldable part for supporting the coupling chuck with freedom for limited lateral movement while the coupling is operatively gripped by it, means for telescopically engaging the coupling chuck with a coupling and means for effecting relative axial and rotational movements of the two chucks to cause working engagement of the pipe and coupling threads; means for tightening the coupling so started on the pipe including chuck means for strongly gripping the pipe and power driven chuck means for strongly gripping the coupling; means for transferring a pipe element and a coupling thereon from the initial assembly pipe chuck to the tightening pipe chuck; and automatic means for effecting operation of the element-starting means, the tightening means and the transfer means in timed relation to each other.

2. Threaded pipe and coupling assembling apparatus comprising means for advancing individual pipe elements and coupling elements to an initial place of assembly; means arranged to apply lubricant on the threads of one element of each pair of pipe and coupling elements as the latter are advanced to the initial place of assembly; means arranged at the said place of assembly for starting the application of a coupling element on the threads of a pipe element including a pipe chuck, a coupling chuck comprising a rotatable mandrel formed to enter and fit within a coupling, means cooperating with the mandrel for frictionally gripping and yieldably driving a coupling positioned on the mandrel, means comprising a resiliently yieldable part for supporting the coupling chuck with freedom for limited lateral movement while the coupling is operatively gripped by it, means for telescopically engaging the coupling chuck with a coupling and means for effecting relative axial and rotational movements of the two chucks to cause engagement of the pipe and coupling threads; means for tightening the coupling so started on the pipe including chuck means for strongly gripping a pipe and chuck means for strongly gripping a coupling; means for transferring a pipe element and a coupling thereon from the initial assembly pipe chuck to the tightening pipe chuck; and automatic means for effecting operation of the lubricating means, the element-starting means, the tightening means and the transfer means in timed relation to each other.

3. Threaded pipe and coupling assembling apparatus comprising means for advancing individual pipe elements and coupling elements to an initial place of assembly; means arranged at the initial place of assembly for starting the application of a coupling element on the threads of a pipe element including a pipe chuck, a coupling chuck having a mandrel formed to enter and fit within the coupling, means connected to the chuck for frictionally gripping and yieldably driving a coupling positioned on the mandrel, means comprising a resiliently yieldable part for supporting the coupling chuck with freedom for limited lateral movement while the coupling is operatively gripped by it, means for telescopically engaging the coupling chuck with a coupling and means for effecting relative axial and rotational movements of the two chucks to cause working engagement of the pipe and coupling threads; means for tightening the coupling so started on the pipe including chuck means for strongly gripping a pipe and chuck means for strongly gripping a coupling, one of said chuck means being movable parallel to the pipe axis and one of them having power means for rotating it about its axis; and power-driven pipe transfer means arranged adjacent the starting and tightening means and operable intermittently in timed relation to the operation of the starting and tightening means to advance a plurality of pipe elements simultaneously, one to the starting means, a second from the starting means to the tightening means and a third from the tightening means to a point of discharge.

4. In power-operated apparatus for assembling threaded pipes and couplings, the combination of means for advancing threaded pipe sections successively to an assembly position; chuck means for holding a pipe section in the assembly position; means for advancing threaded couplings in succession to a predetermined position which is adjacent a threaded end of a chucked pipe section and displaced laterally from the pipe axis and longitudinally from the pipe itself; and means for applying the successive couplings to successive pipe sections comprising a ram structure, means for movably supporting the ram structure, a power driven spindle rotatably mounted in the ram structure, a mandrel-like chuck constructed to telescopically enter and frictionally grip a coupling, means for connecting the mandrel chuck to an end of the spindle constructed to permit limited lateral movement of the chuck while it operatively grips a coupling, and power driven means to effect movement of the ram structure to successively move the mandrel chuck axially into a coupling in the predetermined position, then laterally to carry the coupling into axial alignment with the chucked pipe, then axially to engage the coupling with the pipe and partially thread the coupling on the pipe, then axially to retract the mandrel chuck from the coupling and then laterally to its starting position.

5. In power-operated apparatus for assembling threaded pipes and couplings, the combination of means for advancing threaded pipe sections successively to an assembly position; chuck means for holding a pipe section in the assembly position; means for advancing threaded couplings in succession to a predetermined position which is adjacent a threaded end of a chucked pipe section and displaced laterally from the pipe axis and longitudinally from the pipe itself; means for applying lubricant to the thread of one of the pipe and coupling elements to be assembled in the course of the advance of the element to the assembly position; and means for applying the successive couplings to successive pipe sections comprising a ram structure, means for movably supporting the ram structure, a power-driven spindle rotatably mounted in the ram structure, a mandrel-like chuck constructed to telescopically enter and grip a coupling, means for connecting the mandrel chuck to an end of the spindle constructed to permit limited lateral movement of the chuck while it operatively grips a coupling, and power driven means to effect movement of the ram structure to successively move the mandrel chuck axially into a coupling in the predetermined position, then laterally to carry the coupling into axial alignment with the chucked pipe, then axially to engage the coupling with the pipe and partially thread the coupling on the pipe, then axially to retract the mandrel chuck from the coupling and then laterally to its starting position.

6. Threaded pipe and coupling assembling apparatus comprising means for advancing individual pipe elements and coupling elements to a place of assembly, the means for advancing the couplings including a chute in which the couplings move laterally to a predetermined position; means arranged to apply lubricant on the threads of one element of each pair of pipe and coupling elements as the latter are advanced to the place of assembly; and means arranged at the place of assembly for starting the application of a coupling element on the threads of a pipe element including a pipe chuck, a rotatable coupling chuck comprising a mandrel formed to enter a coupling and having means for yieldably engaging and rotating such coupling, means for rotatably supporting the mandrel with freedom for limited lateral movement while a coupling thereon is rotated by it, and power means for moving the said supporting means axially and laterally to successively move the mandrel axially into telescoping relation with a coupling in the said predetermined position, laterally to carry the said coupling into axial alignment with a chucked pipe, then axially and rotationally to effect thread engagement of the coupling and pipe to partially thread the coupling on the pipe, then axially to retract the mandrel from the coupling and finally laterally to the starting point.

7. Apparatus as claimed in claim 6 in which the lubricant-applying means comprises a lubricant spray nozzle mounted on the means for moving the mandrel-supporting means in position to enter a coupling in the chute when a coupling on the mandrel is advancing axially to engage a chucked pipe element.

8. In apparatus for assembling threaded pipes and couplings, the combination of lubricating means comprising means for supporting pipe and coupling elements to be assembled, a lubricant nozzle, means for effecting relative axial telescoping movement of the nozzle and one of the pipe and coupling elements to be joined together, and means for ejecting lubricant from the nozzle on the threads of such element; and means for applying the coupling to a threaded end of the pipe comprising a chuck for holding the pipe stationary, a mandrel-like coupling chuck comprising means for yieldably gripping a coupling, means for supporting the coupling chuck for rotation about an axis parallel to the axis of the pipe chuck and for bodily movement parallel to its axis of rotation and with freedom for limited yielding lateral movement when a coupling is gripped by the chuck, means for advancing a coupling laterally relative to the coupling chuck, and means for advancing the coupling chuck axially into such coupling and moving the latter axially into engagement with the end of the pipe.

9. Apparatus as claimed in claim 8 in which the lubricant nozzle is formed to enter within the coupling and deliver lubricant upon the internal threads thereof.

10. In power-operated apparatus for assembling threaded pipes and couplings the combination of means for advancing threaded pipe sections successively to an assembly position; chuck means for holding a pipe section in the assembly position; means for advancing threaded couplings in succession to a predetermined position adjacent the assembly position with the axis of the coupling parallel to but laterally displaced from the axis of the pipe in the assembly position; and means for applying the successive couplings to successive pipe sections comprising a ram structure, means for operatively supporting the ram for swinging movement transversely to the axis of a chucked pipe and for longitudinal movement parallel to said axis, respectively, a power driven spindle rotatably mounted in the ram structure parallel to the axis of the pipe chuck, a mandrel-like chuck constructed to telescopically enter and frictionally grip a coupling, means having a resiliently yieldable part for supporting the mandrel chuck yieldably in approximate axial alignment with the spindle, means for transmitting rotation of the spindle to the mandrel chuck, and power driven means to effect the said movements of the ram structure to successively move the mandrel chuck axially into a coupling in the predetermined position, then laterally to carry the said coupling into axial alignment with a chucked pipe then axially to engage the coupling with the pipe and partially thread the coupling on the pipe then axially to retract the mandrel chuck from the coupling and then laterally to its starting position.

11. In threaded pipe and coupling assembling apparatus, the combination of a pipe chuck for holding a pipe stationary; a mandrel-like coupling chuck mounted for rotation about an axis parallel to the axis of the pipe chuck and to move bodily parallel to said axis and transversely of said axis; means for advancing couplings laterally in succession in a predetermined path to a predetermined position with the coupling axis parallel to the axes of the pipe and coupling chucks; means, operable when the coupling chuck is in axial alignment with a coupling in the said predetermined position, for moving the chuck axially into the coupling; means for moving the coupling chuck and the coupling thereon transversely of the pipe chuck axis into axial alignment with the pipe chuck, means for advancing the coupling chuck and coupling axially toward the pipe chuck; and means for applying lubricant upon the internal threads of a succeeding coupling comprising a lubricant spray nozzle mounted in fixed relation to and bodily movable with the coupling chuck, said nozzle being positioned to telescope within the succeeding coupling in the aforesaid predetermined position when the coupling chuck is advanced from its position in alignment with the pipe coupling toward the latter; and means for supplying lubricant under pressure to the spray nozzle while it is telescoped as stated within the succeeding coupling.

12. Threaded pipe and coupling assembling apparatus comprising a chuck for holding a pipe element; means for supporting a series of internally threaded pipe couplings in laterally aligned parallel relation to the axis of the pipe chuck and for successively advancing them laterally in a predetermined path to a predetermined position in relation to the pipe chuck; a rotary mandrel-like coupling chuck; a movable support for the coupling chuck; power means for moving the support to advance the coupling chuck into the leading coupling of the series disposed in the said predetermined position and move it into contact with the end of the chucked pipe; a lubricant spray nozzle secured to and movable with the coupling chuck support in position to enter the next coupling of the series of couplings while the previously lubricated coupling is being moved by the mandrel-chuck into contact with the chuck pipe; and means operating intermittently in timed relation to the movement of the coupling chuck support for supplying lubricant under pressure to the spray nozzle while it is within each entered coupling to spray the entire internally threaded surface of the coupling.

13. In threaded pipe and coupling assembling apparatus, the combination of a pipe chuck for holding a pipe stationary; a mandrel-like coupling chuck mounted for rotation about an axis parallel to the axis of the pipe chuck and to move bodily parallel to said axis and transversely of said axis; means for advancing couplings laterally in succession in a predetermined path to a predetermined position with the coupling axis parallel to the axes of the pipe and coupling chucks; means, operable when the coupling chuck is in axial alignment with a coupling in the said predetermined position, for moving the chuck axially into the coupling; means for moving the coupling chuck and the coupling thereon transversely of the pipe chuck axis into axial alignment with the pipe chuck; means for advancing the coupling chuck and coupling axially toward the pipe chuck; and means for applying lubricant upon the internal threads of a succeeding coupling comprising a lubricant spray nozzle mounted in fixed relation to and bodily movable with the coupling chuck, said nozzle being positioned to telescope within the succeeding coupling in the aforesaid predetermined position when the coupling chuck is advanced from its position in alignment with the pipe coupling toward the latter; means for supplying lubricant under pressure to the spray nozzle while it is telescoped as stated within the succeeding coupling; a compressed air nozzle disposed adjacent the path of the couplings leading to said predetermined position and at a point in advance of the said position; and means actuated in timed relation to the advance of the couplings in the said predetermined path for supplying compressed air to the said nozzle to free the threads of each coupling from metal chips before said threads are sprayed with lubricant.

14. In threaded pipe and coupling assemblying apparatus, the combination of pipe holding means at the assembly position; pipe transfer means for advancing the pipe sections to the holding means, means for advancing internally threaded couplings in succession to a predetermined position adjacent the pipe holding means with the coupling axis parallel to the axis of a held pipe; a mandrel-like chuck device formed to enter a coupling and comprising magnetic means for yieldably gripping the coupling to effect frictional driving engagement between the chuck and the coupling; supporting means for the coupling chuck, said means comprising a resiliently yieldable part and being operable while a coupling is gripped by the chuck to support the chuck yieldably in approximate axial alignment with the held pipe section with possible limited lateral movement relative to the axis of the held pipe; power means for rotating the chuck supporting means operative in all positions of lateral movement of the said supporting means; and means for advancing the rotating chuck axially to partially thread the coupling on the pipe.

15. In threaded pipe and coupling assembling apparatus, the combination of pipe holding means at the assembly position; pipe transfer means for advancing pipe sections to the holding means; means for advancing couplings in succession to a predetermined position adjacent the pipe holding means with the coupling axis parallel to the axis of a held pipe; means for applying lubricant to the threaded surface of one of the pipe and coupling elements in the course of its advance to the assembly position; the said means comprising a movably supported spray nozzle, means for supplying lubricant under pressure to the spray nozzle and means for moving the spray nozzle into each coupling element in the course of its advance to the said assembly position; a mandrel-like chuck device formed to enter a coupling and comprising means for gripping such coupling; supporting means for the chuck, said means comprising a resiliently yieldable part and being operable while a coupling is gripped by the chuck to support the chuck yieldably in approximate axial alignment with the held pipe section with possible limited lateral movement relative to the axis of the held pipe; power means for rotating the said chuck supporting means operative in all positions of lateral adjustment of the said supporting means; and means for advancing the rotating chuck axially to partially thread the coupling on the pipe.

16. In threaded pipe and coupling assembling apparatus, the combination of pipe holding means at the assembly position; pipe transfer means for advancing pipe sections to the holding means; means for advancing couplings in succession to a predetermined position adjacent the pipe holding means with the coupling axis parallel to the axis of a held pipe; means for applying lubricant to the threaded surface of one of the pipe and coupling elements in the course of its advance to the assembly position, the lubricant-applying means comprising an annular spray nozzle of a diameter to surround the threaded end of a pipe element and discharge lubricant on its threaded surface and the means for advancing individual pipe sections being constructed to move the threaded end of each pipe element into the annular spray nozzle in the course of the pipe's advance to the place of assembly; a mandrel-like chuck device formed to enter a coupling and comprising means for gripping such coupling; supporting means for the chuck, said means comprising a resiliently yieldable part and being operable while a coupling is gripped by the chuck to support the chuck yieldably in approximate axial alignment with the held pipe section with possible limited lateral movement relative to the axis of the held pipe; power means for rotating the said chuck supporting means operative in all positions of lateral adjustment of the said supporting means; and means for advancing the rotating chuck axially to partially thread the coupling on the pipe.

17. In threaded pipe and coupling assembling apparatus, the combination of pipe holding means at the assembly position; pipe transfer means for advancing pipe sections to the holding means; means for advancing couplings in succession to a predetermined position adjacent the pipe holding means with the coupling axis parallel to the axis of a held pipe; means for applying lubricant to the threaded surface of one of the pipe and coupling elements in the course of its advance to the assembly position, the lubricant-applying means comprising an annular spray nozzle of a diameter to surround the threaded end of a pipe element and deliver lubricant on its threaded surface, means for supplying lubricant under pressure to the nozzle, and means for effecting relative axial movement of the pipe and nozzle after discharge of lubricant on the pipe; a mandrel-like chuck device formed to enter a coupling and comprising means for gripping such coupling; supporting means for the chuck, said means comprising a resiliently yieldable part and being operable while a coupling is gripped by the chuck to support the chuck yieldably in approximate axial alignment with the held pipe section with possible limited lateral movement relative to the axis of the held pipe; power means for rotating the said chuck supporting means operative in all positions of lateral adjustment of the said supporting means; and means for advancing the rotating chuck axially to partially thread the coupling on the pipe.

18. Apparatus as claimed in claim 17 in which the means for supplying lubricant under pressure comprises a pump plunger and operative connections between the plunger and the means for effecting relative axial movement of the pipe and nozzle, the said connections being constructed to cause movement of the plunger in advance of the said relative movement.

References Cited in the file of this patent

UNITED STATES PATENTS

| | | |
|---|---|---|
| 1,398,338 | Mirrielees | Nov. 29, 1921 |
| 1,462,305 | Snyder | July 17, 1923 |
| 1,479,178 | Harvey | Jan. 1, 1924 |
| 1,529,017 | Dyblie | Mar. 10, 1925 |
| 1,611,122 | Mirfield | Dec. 14, 1926 |
| 1,660,416 | Crehan | Feb. 28, 1928 |
| 1,679,865 | Konigsberg | Aug. 7, 1928 |
| 1,762,192 | Peirce | June 10, 1930 |
| 1,765,825 | Cork | June 24, 1930 |
| 1,850,479 | Shelton | Mar. 22, 1932 |
| 2,336,573 | Seeley | Dec. 14, 1943 |
| 2,339,807 | Rau | Jan. 25, 1944 |
| 2,373,785 | Seaboly | Apr. 17, 1945 |
| 2,380,306 | Hallowell | July 10, 1945 |

FOREIGN PATENTS

| | | |
|---|---|---|
| 106,736 | Great Britain | June 7, 1917 |